(12) United States Patent
Mirsky et al.

(10) Patent No.: US 9,979,515 B2
(45) Date of Patent: May 22, 2018

(54) CONTROL FOR BFD RETURN PATH

(71) Applicant: Telefonaktiebolaget L M Ericsson (publ), Stockholm (SE)

(72) Inventors: Gregory Mirsky, Pleasanton, CA (US); Evgeny Tantsura, Palo Alto, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 326 days.

(21) Appl. No.: 14/512,259

(22) Filed: Oct. 10, 2014

(65) Prior Publication Data

US 2015/0381324 A1 Dec. 31, 2015

Related U.S. Application Data

(60) Provisional application No. 62/019,244, filed on Jun. 30, 2014.

(51) Int. Cl.
| | |
|---|---|
| *H04L 1/00* | (2006.01) |
| *H04L 1/24* | (2006.01) |
| *H04L 12/26* | (2006.01) |
| *H04L 12/701* | (2013.01) |
| *H04L 12/751* | (2013.01) |
| *H04L 12/707* | (2013.01) |

(Continued)

(52) U.S. Cl.
CPC ............ *H04L 1/24* (2013.01); *H04L 43/0847* (2013.01); *H04L 45/00* (2013.01); *H04L 45/02* (2013.01); *H04L 45/22* (2013.01); *H04L 45/28* (2013.01); *H04L 45/50* (2013.01); *H04L 2012/5625* (2013.01)

(58) Field of Classification Search
None
See application file for complete search history.

(56) References Cited

U.S. PATENT DOCUMENTS 7,852,778 B1 * 12/2010 Kompella .................. 370/242
8,374,164 B2 * 2/2013 Nadeau ................ H04L 41/12
370/225

(Continued)

OTHER PUBLICATIONS

Aggarwal, et al., "BFD for MPLS LS; draft-ietf-bfd-mpls-07.txt," Network Working Group, Internet Draft, Internet Engineering Task Force (IETF), Jun. 20, 2008, 13 pages.

(Continued)

*Primary Examiner* — Willie J Daniel, Jr.
(74) *Attorney, Agent, or Firm* — NDWE, LLP

(57) ABSTRACT

A method is implemented by a network device to establish a bidirectional forwarding detection (BFD) session with a defined return path to enable detection of data plane failures between an active node and a passive node in a network where a forward path and a reverse path between the active node and the passive node are not co-routed. The method includes receiving a label switched path (LSP) ping including a BFD discriminator type length value (TLV) of the active node and a return path TLV describing a return path to the active node. The BFD discriminator of the active node and a BFD discriminator of the passive node are associated with the BFD session. The return path is associated with the BFD session between the active node and the passive node, and BFD control packets are sent to the active node using the return path to detect a failure on the return path.

18 Claims, 7 Drawing Sheets

(51) Int. Cl.
H04L 12/703 (2013.01)
H04L 12/723 (2013.01)
H04L 12/70 (2013.01)

(56) References Cited

U.S. PATENT DOCUMENTS

| | | | | |
|---|---|---|---|---|
| 8,521,896 B2* | 8/2013 | Liu | | H04L 12/4633 370/352 |
| 8,665,699 B2* | 3/2014 | Bellagamba | | H04L 41/0677 370/216 |
| 8,902,780 B1* | 12/2014 | Hegde | | H04L 45/70 370/252 |
| 9,094,344 B2* | 7/2015 | Boutros | | H04L 49/351 |
| 9,497,107 B1* | 11/2016 | Akiya | | H04L 45/22 |
| 2016/0036695 A1* | 2/2016 | Mirsky | | H04L 45/507 370/243 |

OTHER PUBLICATIONS

Akiya, et al., "Label Switched Path (LSP) Ping/Trace Reply Mode Simplification; draft-akiya-mpls-lsp-ping-reply-mode-simple-01," Internet Engineering Task Force (IETF), Internet-Draft, IETF Trust, Dec. 15, 2013, 8 pages.

Chen, et al., "BFD for MPLS LSPs Enhancement; draft-chen-mpls-bfd-enhancement-01.txt," Network Working Group, Internet Draft, Internet Engineering Task Force (IETF), IETF Trust, Mar. 2010, 10 pages.

Chen, et al., "Return Path Specified LSP Ping; draft-ietf-mpls-return-path-specified-lsp-ping-11.bd," Network Working Group, Internet Draft, Internet Engineering Task Force (IETF), IETF Trust, Oct. 22, 2012, 21 pages.

Mirsky, et al., "Bidirectional Forwarding Detection (BFD) Directed Return Path; draft-mirsky-mpls-bfd-directed-00," Internet Engineering Task Force (IETF), MPLS Working Group, Internet-Draft, IETF Trust, Jun. 30, 2014, 8 pages.

Aggarwal, R., et al., "Bidirection Forwarding Detection (BFD) for MPLS Label Switched Paths (LSPs)", Internet Engineering Task Force (IETF); RFC 5884; Jun. 2010; 12 ppages.

Ali, Z., et al., "Node—IDS Based Resource Reservation Protocol (RSVP) Hello: A Clarification Statement", Network Working Group; RFC 4558; Jun. 2006; 7 pages.

Andersson, L., et al., "LDP Specification", Network Working Group, Request for Comments: 5036, (Oct. 2007), 135 pages.

Awduche, D., et al., "RSVP-TE: Extensions to RSVP for LSP Tunnels", Network Working Group, Request for Comments: 3209, The Internet Society, http://tools.ietf.org/html/rfc3209, (Dec. 2001), 61 pages.

Babiarz, J., et al., "Configuration Guidelines for DiffServ Service Classes", Network Working Group, Request for Comments: 4594, The Internet Society, (Aug. 2006), 57 pages.

Baker, F., et al., "A Differentiated Services Code Point (DSCP) for Capacity-Admitted Traffic", Internet Engineering Task Force (IETF), Request for Comments: 5865, (May 2010), 14 Pages.

Baker, F., et al., "Management Information Base for the Differentiated Services Architecture", Network Working Group, Request for Comments: 3289, The Internet Society, (May 2002), 116 pages.

Berger, L., "Generalized Multi-Protocol Label Switching (GMPLS) Signaling Resource ReserVation Protocol-Traffic Engineering (RSVP-TE) Extensions", Network Working Group, Request for Comments: 3473, http://tools.ietf.org/html/rfc3473, (Jan. 2003), 42 pages.

Bernet, Y., et al., "An Informal Management Model for Diffserv Routers", Network Working Group, Request for Comments: 3290, The Internet Society, (May 2002), 56 pages.

Black, D., "Differentiated Services and Tunnels", Network Working Group, Request for Comments: 2983, The Internet Society, (Oct. 2000), 14 pages.

Black, D., et al., "Per Hop Behavior Identification Codes", Network Working Group, Request for Comments: 3140, The Internet Society, (Jun. 2001), 8 pages.

Blake, S., et al., "An Architecture for Differentiated Services", Network Working Group, Request for Comments 2475, The Internet Society, (Dec. 1998), 36 pages.

Borman, D., et al., "IPv6 Jumbograms", Network Working Group, Request for Comments: 2675, The Internet Society, (Aug. 1999), 9 pages.

Braden, et al., "Resource ReSerVation Protocol (RSVP)—Version 1 Functional Specification", Network Working Group, Request for Comments: 2205, (Sep. 1997), 112 pages.

Chan, K., et al., "Differentiated Services Quality of Service Policy Information Base", Network Working Group, Request for Comments: 3317, The Internet Society, (Mar. 2003), 96 pages.

Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.

Coltun, R., et al., "OSPF for IPv6", Network Working Group, Request for Comments: 5340, (Jul. 2008), 94 pages.

Davie, B., et al., "An Expedited Forwarding PHB (Per-Hop Behavior)", Network Working Group, Request for Comments: 3246, The Internet Society, (Mar. 2002), 16 pages.

Deering, et al., "Internet Protocol, Version 6 (IPv6) Specification", Network Working Group, Request for Comments: 2460, The Internet Society, (Dec. 1998), 39 pages.

Eggert, L., et al., "Unicast UDP Usage Guidelines for Application Designers", Network Working Group, Request for Comments: 5405, IETF Trust, (Nov. 2008), 27 pages.

Fenner, B., et al., "Management Information Base for the User Datagram Protocol (UDP)", Network Working Group, Request for Comments: 4113, The Internet Society, (Jun. 2005), 19 pages.

Grossman, D., "New Terminology and Clarifications for Diffserv", Network Working Group, Request for Comments: 3260, The Internet Society, (Apr. 2002), 10 pages.

Hedrick, C., "Routing Information Protocol", Network Working Group, Request for Comments: 1058, (Jun. 1988), 33 pages.

Heinanen, J., et al., "Assured Forwarding PHB Group", Network Working Group; RFC 2597; Jun. 1999; 11 pages.

Housley, "Using Advanced Encryption Standard (AES) CCM Mode with IPsec Encapsulating Security Payload (ESP)", Network Working Group, Request for Comments: 4309, The Internet Society, (Dec. 2005), 13 pages.

Information Sciences Institute, University of Southern C., "Transmission control protocol darpa Internet program protocol specification", Sep. 1981, Request for Comments: 793, 91 pages.

Katz, D., et al., "Bidirectional Forwarding Detection (BFD)", Jun. 2010, 49 pages, Internet Engineering Task Force (IETF), Request for Comments: 5880, IETF Trust.

Katz, D., et al., "Bidirectional Forwarding Detection (BFD) for IPv4 and IPv6 (Single Hop)", Internet Engineering Task Force (IETF), Request for Comments: 5881, (Jun. 2010), 7 pages.

Katz, D., et al., "Bidirectional Forwarding Detection (BFD) for Multihop Paths", Internet Engineering Task Force (IETF), Request for Comments: 5883, (Jun. 2010), 6 pages.

Kent, et al., "Security Architecture for the Internet Protocol", Network Working Group, Request for Comments: 4301, The Internet Society, (Dec. 2005), 101 pages.

Kompella, et al., "Procedures for Modifying the Resource reSerVation Protocol (RSVP)", Network Working Group, Request for Comments: 3936, The Internet Society, (Oct. 2004), 7 pages.

Malkin, G., "RIP Version 2", Network Working Group, Request for Comments: 2453, The Internet Society, (Nov. 1998), 39 pages.

Malkin, et al., "RIPng for IPv6", Network Working Group, Request for Comments: 2080, (Jan. 1997), 19 pages.

Moy, J., "OSPF Version 2", Network Working Group, Request for Comments: 2328, The Internet Society, (Apr. 1998), 244 pages.

Nichols, K., et al., "Definition of Differentiated Services Per Domain Behaviors and Rules for their Specification", Network Working Group, Request for Comments: 3086, The Internet Society, (Apr. 2001), 24 pages.

(56) References Cited

OTHER PUBLICATIONS

Nichols, K., et al., "Definition of the Differentiated Services Field (DS Field) in the IPv4 and IPv6 Headers", Network Working Group, Request for Comments: 2474, The Internet Society, (Dec. 1998), 20 pages.
Oran, David, "OSI ISIS Intradomain Routing Protocol", Network Working Group, Request for Comments: 1142, (Feb. 1990), 157 pages.
Polk, et al., "A Resource Reservation Protocol (RSVP) Extension for the Reduction of Bandwidth of a Reservation Flow", Network Working Group, Request for Comments: 4495, The Internet Society, (May 2006), 21 pages.
Postel, J., "User Datagram Protocol," 28 Aug. 1980, 3 pages, RFC: 768.
Rekhter, Y., et al., "A Border Gateway Protocol 4 (BGP-4)", Network Working Group, Request for Comments: 4271, (Jan. 2006), 104 pages.
Rosen, et al., "BGP/MPLS IP Virtual Private Networks (VPNs)", Network Working Group, Request for Comments: 4364, The Internet Society, (Feb. 2006), 47 pages.
Shenker, et al., "Specification of Guaranteed Quality of Service", Network Working Group, Request for Comments: 2212, (Sep. 1997), 20 pages.
Socolofsky, T., et al., "A TCP/IP Tutorial", Network Working Group, Request for Comments: 1180, (Jan. 1991), 28 pages.
Wroclawski, J., "Specification of the Controlled-Load Network Element Service", Network Working Group, Request for Comments: 2211, (Sep. 1997), 19 pages.
Wroclawski, J., "The Use of RSVP with IETF Integrated Services", Network Working Group, Request for Comments: 2210, (Sep. 1997), 33 pages.

\* cited by examiner

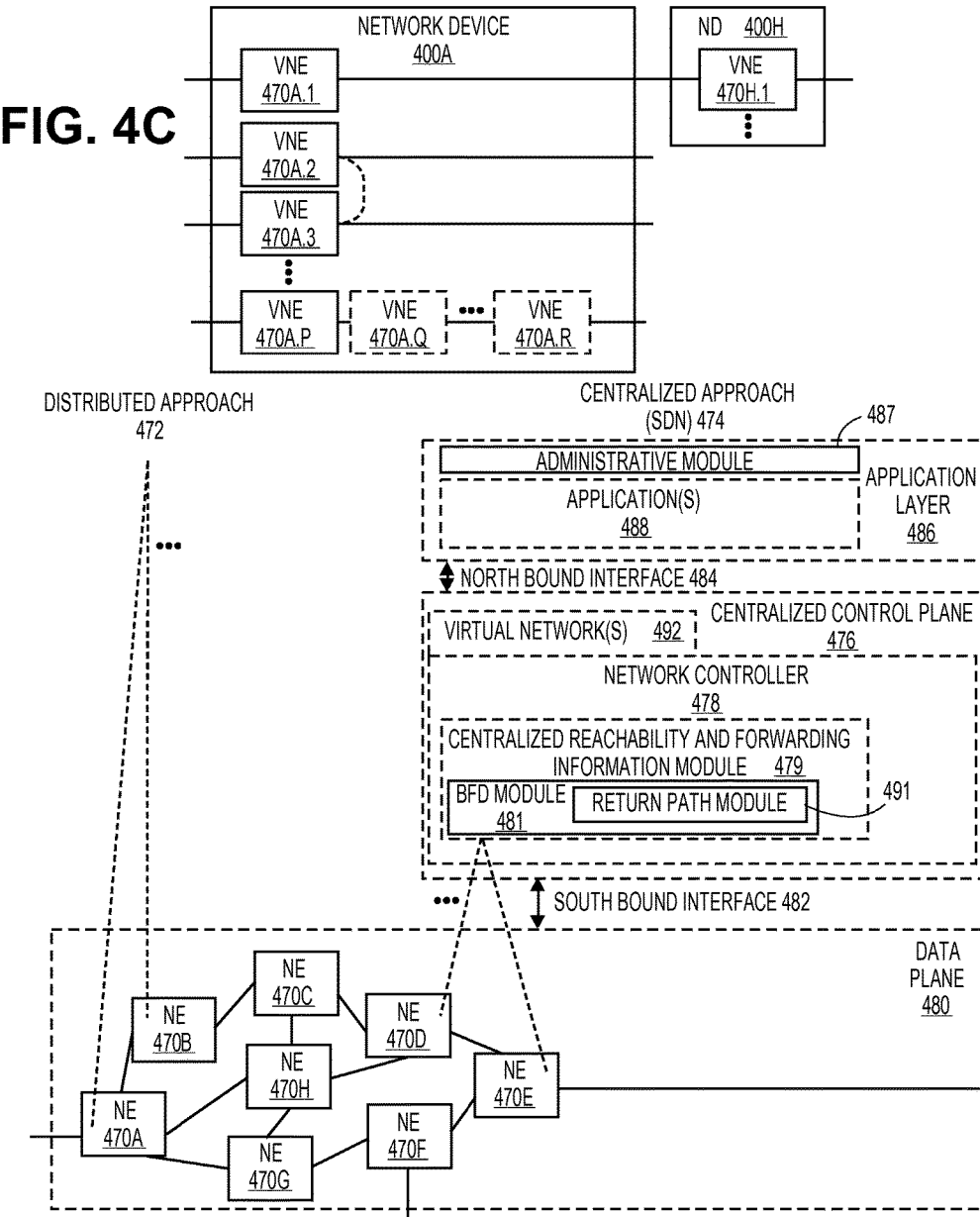
FIG. 4C
FIG. 4D
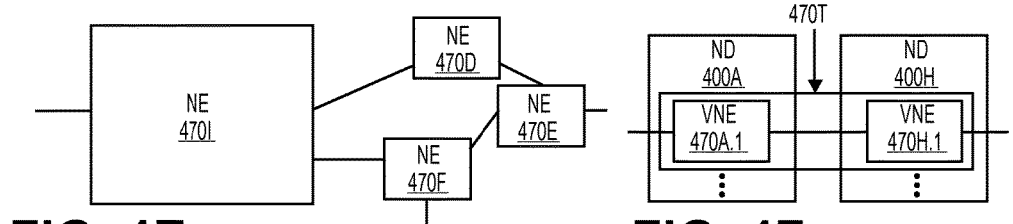
FIG. 4E
FIG. 4F

CONTROL FOR BFD RETURN PATH

CROSS-REFERENCE TO RELATED APPLICATION

The present application claims priority from U.S. Provisional Patent Application No. 62/019,244, filed on Jun. 30, 2014.

FIELD

Embodiments of the invention relate to detection of data plane failures. Specifically, the embodiments relate to a method for detecting data plane failures when explicit paths and best route paths utilized in the forward and reverse directions between two nodes in a network are not co-routed.

BACKGROUND

Bidirectional forwarding detection (BFD) is a network protocol used to detect faults between two nodes in a network connected by a link or path across the network. The Internet Engineering Task Force (IETF) Request for Comments (RFC) 5880 sets forth that the base protocol for "Bidirectional Forwarding Detection (BFD)" may apply to any network, including to Internet Protocol (IP) networks. Predominantly, path selection between nodes in IP networks is controlled through dynamic routing protocols and selection of the best available route to a given network node. Routing protocols and rules of selecting the best route are designed to ensure that an IP packet follows the best route (e.g., the route with the lowest cost measure) from one node to another node towards a destination without causing the IP packet to loop in the network.

The BFD protocol uses control packets to detect failures in the network. These control packets are sent between the end nodes of a BFD session, where a failure of N consecutive control packets to arrive at the opposite end indicates a failure in the link or path, where N is defined as the Detect Multiplier in RFC 5880 and may be set to 1, but more often has a value of 3. BFD control packets, like other IP data packets, will follow the best route to the destination node and thus ensure an in-band requirement that is set forth toward Operation, Administration, and Maintenance (OAM) mechanisms. Because IP routing is usually symmetrical (i.e., the best routes between two IP end points traverse the same nodes), BFD control packets in the forward and reverse directions of a BFD session between two nodes usually traverse the same nodes. As a result, any detected unidirectional failure in the link or path can be considered as a bidirectional defect and can be acted upon accordingly. However, the best route model does not allow control of traffic distribution beyond the best route paths.

An alternative to the best route paradigm is a method wherein an entire path is predetermined, for example, either by a controller or at the ingress node. This can be done either by directing packets into an explicitly-routed tunnel or by explicitly specifying all intermediate nodes for each packet. In general, such paths need to be viewed as unidirectional. Because BFD is predominantly used in its asynchronous mode, the far-end peer node is likely to select the best available route when sending its BFD control packets. As a result, BFD control packets may not cross the same set of nodes in the forward and reverse directions. Thus, a unidirectional failure cannot be interpreted as an indication of a bidirectional defect, and in certain scenarios, a defect would not be detected for an extended period of time.

SUMMARY

A method is implemented by a network device to establish a bidirectional forwarding detection (BFD) session with a defined return path to enable detection of data plane failures between an active node and a passive node in a network where a forward path and a reverse path between the active node and the passive node are not co-routed. The method includes receiving a label switched path (LSP) ping including a BFD discriminator type length value (TLV) of the active node and a return path TLV describing a return path to the active node. A BFD discriminator of the active node and a BFD discriminator for the passive node are associated with the BFD session. The return path is associated with the BFD session between the active node and the passive node, and BFD control packets are sent to the active node using the return path to detect a failure on the return path.

A network device establishes a bidirectional forwarding detection (BFD) session with a defined return path to enable detection of data plane failures between an active node and a passive node in a network where a forward path and a reverse path between the active node and the passive node are not co-routed. The network device includes a non-transitory machine-readable storage medium configured to store a BFD module and a return path module and a network processor. The network processor is communicatively coupled to the non-transitory machine-readable storage medium. The network processor is configured to execute the BFD module and the return path module. The BFD module is configured to receive an LSP ping including a BFD discriminator TLV of the active node and a return path TLV describing a return path to the active node, and to associate a BFD discriminator of the active node and a BFD discriminator for the passive node with the BFD session. The return path module is configured to associate the return path with a BFD session between the active node and the passive node, and to send BFD control packets to the active node using the return path to detect a failure on the return path.

A computing device executes a plurality of virtual machines for implementing network function virtualization (NFV), wherein a virtual machine from the plurality of virtual machines is configured to execute a method to establish a bidirectional forwarding detection (BFD) session with a defined return path to enable detection of data plane failures between an active node and a passive node in a network where a forward path and a reverse path between the active node and the passive node are not co-routed. The computing device includes a non-transitory machine-readable storage medium configured to store a BFD module and a return path module. The computing device also includes a processor communicatively coupled to the non-transitory machine-readable storage medium. The processor is configured to execute the virtual machine that executes the BFD module and the return path module. The BFD module is configured to receive an LSP ping including a BFD discriminator TLV of the active node and a return path TLV describing a return path to the active node, and to associate a BFD discriminator of the active node and a BFD discriminator of the passive node with the BFD session. The return path module is configured to associate the return path with a BFD session between the active node and the passive node, and to send BFD control packets to the active node using the return path to detect a failure on the return path.

A control plane device is configured to implement at least one centralized control plane for a software defined network (SDN). The centralized control plane is configured to execute a method to establish a bidirectional forwarding detection (BFD) session with a defined return path to enable detection of data plane failures between an active node and a passive node in a network where a forward path and a reverse path between the active node and the passive node are not co-routed. The control plane device includes a non-transitory machine-readable storage medium configured to store a BFD module and a return path module and a processor communicatively coupled to the non-transitory machine-readable storage medium. The processor is configured to execute the BFD module and the return path module. The BFD module is configured to determine a BFD discriminator of the active node and a return path to the active node, and to associate the BFD discriminator of the active node and a BFD discriminator of the passive node with the BFD session. The return path module is configured to associate the return path with a BFD session between the active node and the passive node, and to configure the passive node to send BFD control packets to the active node using the return path to detect a failure on the return path.

BRIEF DESCRIPTION OF THE DRAWINGS

The invention may best be understood by referring to the following description and accompanying drawings that are used to illustrate embodiments of the invention. In the drawings:

FIG. 4C illustrates various exemplary ways in which virtual network elements (VNEs) may be coupled according to some embodiments of the invention.

FIG. 4D illustrates a network with a single network element (NE) on each of the NDs of FIG. 4A.

FIG. 4E illustrates an example where each of the NDs implements a single NE (see FIG. 4D), but the centralized control plane has abstracted multiple ones of the NEs in different NDs into a single NE in one of the virtual network (s) of FIG. 4D, according to some embodiments of the invention.

FIG. 4F illustrates a case where multiple VNEs are implemented on different NDs and are coupled to each other, and where the centralized control plane has abstracted these multiple VNEs such that they appear as a single VNE within one of the virtual networks of FIG. 4D, according to some embodiments of the invention.

DETAILED DESCRIPTION

Figure 1:
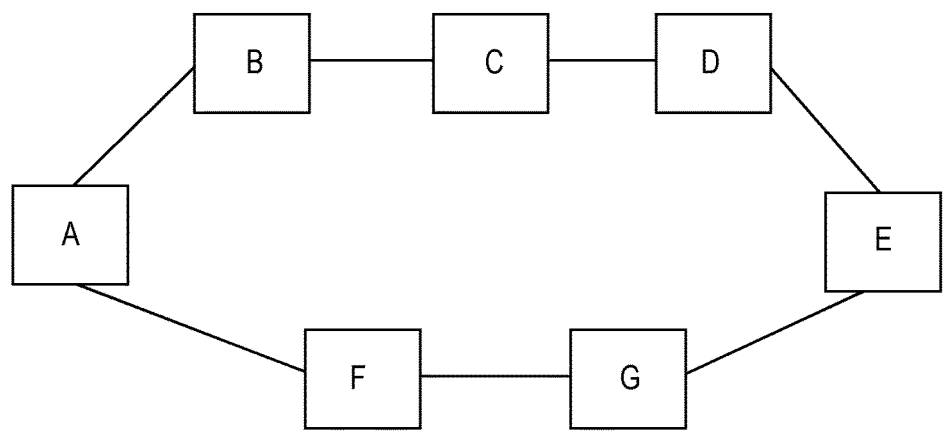
FIG. 1 is a diagram of one embodiment of an example network in which bidirectional forwarding detection (BFD) is implemented.

The following description describes methods and apparatus for establishing an asynchronous BFD session with support for defining an explicit return path that can be co-routed or not co-routed with a forward path. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

The IETF RFC 5880, the IETF RFC 5881 entitled "Bidirectional Forwarding Detection (BFD) for IPv4 and IPv6 (Single Hop)," and the IETF RFC 5883 entitled "Bidirectional Forwarding Detection (BFD) for Multihop Paths" established the BFD protocol for Internet Protocol (IP) networks. The IETF RFC 5884 entitled "Bidirectional Forwarding Detection (BFD) for MPLS Label Switched Paths (LSPs)" describes a procedure for using BFD in asynchronous mode over IP/Multiprotocol Label Switching (MPLS) LSPs. These standards implicitly presume that the best route (e.g., the route with the lowest cost measure) between a near-end node establishing a BFD session and a far-end peer node of the BFD session will be used, regardless of the actual route used by that far-end peer node to send its BFD control packets to the near-end node. The term near-end node indicates a node that initiates a BFD session with a target node. The term far-end node indicates the target node of a BFD session. These can be any two nodes in a network that support the BFD related standards.

BFD has two operational modes, (1) demand mode and (2) asynchronous mode. In demand mode, no hello packets are automatically exchanged after the session is established; rather, the two endpoints can exchange hello packets as needed. Asynchronous mode provides the scheduled or periodic exchange of hello packets or similar BFD control packets between the two end nodes. When these BFD control packets fail to arrive at the destination node then a failure is assumed to have occurred along the path. The embodiments described herein contemplate a modification to the asynchronous mode of operation.

As discussed above, BFD is expected to monitor bidirectional co-routed paths (i.e., the forward direction path from the near-end node to the far-end node, and the return direction path from the far-end node to the near-end node). In most IP and IP/MPLS networks, the best route between two IP nodes is likely to be co-routed in a stable network environment, and thus, that implicit BFD requirement is fulfilled. However, when the forward direction path of a BFD session is explicitly routed (e.g., not using the best route) while the return direction path of the BFD session uses the best route, several scenarios present a problem:
 a. A failure detected on the return direction path cannot be interpreted as a bidirectional failure, because the forward and return direction paths are not co-routed. If it is incorrectly interpreted as a bidirectional failure, unnecessary protection switchover of the forward direction path may occur.
 b. If the return direction path is in the down state, the near-end peer node would not receive an indication of a forward direction path failure from its far-end peer node.

FIG. 1 illustrates nodes and links of an example network wherein the BFD-monitored paths in the forward and return directions between peer nodes A and E are not co-routed. This example network is used to show the problems in BFD monitoring where the forward direction path and the return direction path are not co-routed. In the example BFD session of FIG. 1, peer node A is the near-end peer node, and peer node E is the far-end peer node. The path in the forward direction between peer nodes A and E is explicitly routed as A-B-C-D-E. In contrast, the path in the return direction between peer nodes E and A is the best route E-G-F-A. Thus, the BFD-monitored paths in the forward and return directions are not co-routed at any intermediate node or link. If a failure on the path in the return direction (e.g., a failure in the link between nodes F and G) is detected by peer node A, that failure should not be interpreted as a failure on the path in the forward direction, on the explicitly-routed A-B-C-D-E path. Moreover, if peer node E detects a failure on the path in the forward direction (e.g., a failure in the link between nodes C and D on the explicitly-routed A-B-C-D-E path), then peer node A should not receive an indication of this forward direction failure from peer node E, even for example, if the return direction path is not in the down state, as the peer node E can continue to function on its return path.

The embodiments of the invention provide a system and method to overcome these limitations of the existing standards, such that the method to use BFD in MPLS networks can properly handle non-co-routed forward direction path and return direction path. In the embodiments, a session initiating near-end peer node uses LSP Ping with a BFD Discriminator Type-Length-Value (TLV) so that the far-end peer node can properly associate the BFD session with the sending near-end peer node. In effect, LSP Ping bootstraps a BFD session between two peer nodes, e.g., Label Switch Routers (LSRs). The embodiments further introduce a mechanism for the near-end peer node to instruct the far-end peer node to use a particular path or an explicit MPLS label stack to send the far-end peer node's BFD control packets in the return direction of the BFD session that is being bootstrapped.

The embodiments further overcome the limitations of the prior art such that a near-end peer node (e.g., an LSR) that is to monitor an explicitly-routed unidirectional LSP uses LSP Ping to bootstrap the BFD session by informing the far-end peer node (e.g., an LSR) of the near-end peer node's BFD Discriminator (i.e., using the BFD Discriminator TLV). The near-end peer node includes an LSP identifier (ID) or lists an explicit MPLS label stack in a BFD Return Path TLV (referred to herein simply as the return path TLV) to be used by the far-end peer node to send the far-end peer node's BFD control packets in the return direction.

When the far-end peer node receives the LSP Ping, the far-end peer node locates the BFD Discriminator TLV from the LSP Ping and associates the LSP with the value of the near-end peer node's BFD Discriminator. The far-end peer node then locates the BFD Return Path TLV with the LSP ID or the explicit MPLS label stack from the LSP Ping. The far-end peer node verifies availability of the specified path (i.e. the path indicated by the LSP ID or the explicit MPLS label stack) and, if the availability is verified, associates this specified path with the BFD session. The far-end peer node then begins to send its BFD control packets with the My Discriminator value set to the far-end peer node's BFD Discriminator, and the Your Discriminator value set to the value received in the BFD Discriminator TLV (i.e., the near-end peer node's BFD Discriminator) over the path specified in the BFD Return Path TLV. Alternatively, if the specified path is not available, the far-end peer node notifies the near-end peer node of the error using an LSP Ping Reply and may use the best route to send BFD control packets in the return direction.

In other embodiments, other mechanisms may be used to instruct the far-end peer node (e.g., an LSR) to use a particular return path to send BFD control packets in the return direction. For example, the path could be collected as the packet flies by, centralized control (e.g., via an Operations Support System (OSS) or Software-Defined networking (SDN)) could be used to retrieve information about, or an indication of, the particular path to use in the reverse direction, the particular path could be encoded in an identifier, or similar techniques can be implemented.

The embodiments provide significant benefits over the prior art BFD systems. For example, directing the far-end peer node of the BFD session to use a particular path for sending the far-end peer node's BFD control packets in the return direction enables those BFD control packets to traverse the same nodes and links as traversed in the forward direction, even when the BFD-monitored path in the forward direction is explicitly routed. Moreover, because the BFD session is maintained over a bidirectional co-routed path when using the process described herein, detection of a failure in one direction can be reliably interpreted and treated as an indication of a bidirectional defect in the path.

Figure 2A:
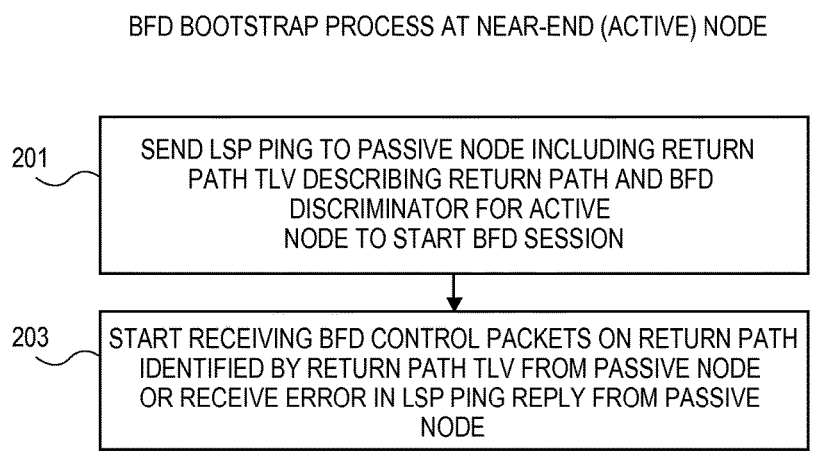
FIG. 2A is a flowchart of one embodiment of a process for establishing a BFD session by a near-end node.

FIG. 2A is a flowchart of one embodiment the process for establishing a BFD session by the near-end node. The near-end node can be any node in any type of network. A node, as referred to herein, is a computing device or networking device that can communicate over a connected network with other nodes. The BFD session can be initiated as directed by a user or based on a local policy of the implementing device. The near-end node can also be referred to herein as an 'active' node to distinguish it from the far-end node or 'passive' node. The active and passive nodes are peer nodes in the network with a set of defined paths such as LSPs between them. A 'set,' as used herein refers to any positive whole number of items including at least one item. In this context, the active node and passive node are assumed to have at least two paths between them to enable the possibility of a forward path and a return path between the active node and passive node that are not co-located such that a BFD session can be established with differing forward and return paths.

The process begins with initiating the BFD session by the active node sending an LSP ping to the passive node (Block 201). The LSP ping is utilized to bootstrap the BFD session, since BFD does not have defined a remote initiation process. The LSP ping is a type of message and, as used herein, refers to a modified form of the message that includes a discriminator TLV and a return path TLV. The BFD discriminator TLV includes a BFD discriminator that is a value utilized in the network to distinguish between nodes in the network that are communicating with the receiving node. The BFD discriminator is locally unique to the receiving node, but may not be globally unique for the network.

The return path TLV can identify a path between the active node and passive node by including an LSP identifier or an MPLS stack, which is a set of MPLS labels for traversing LSRs between the active node and passive node. In further embodiments, any system or format for identifying a path between the active node and passive node can be utilized such that it can be stored in a return path TLV. The LSP ping containing the BFD discriminator TLV and return path TLV causes the passive node to establish the BFD session.

The passive node establishes the BFD session using the BFD discriminator provided by the BFD discriminator TLV and the return path identified by the return path TLV to send BFD control packets to the active node along the return path, such that the active node receives the BFD control packets (Block 203). This assumes that no error occurred at the passive node when it processed the LSP ping. If an error did occur, then an LSP ping reply would be sent by the passive node and received by the active node (Block 203). To properly establish the BFD session, the BFD control packets sent by the passive node must include the BFD discriminator of the active node. The active node begins receiving the BFD control packets over the return path and can thereafter detect a distinct failure in the return path or forward path when the BFD control packets are not received at either the active node or passive node. Operation of the BFD session can continue indefinitely until a failure occurs or the BFD session is terminated by either the active node or passive node.

Figure 2B:
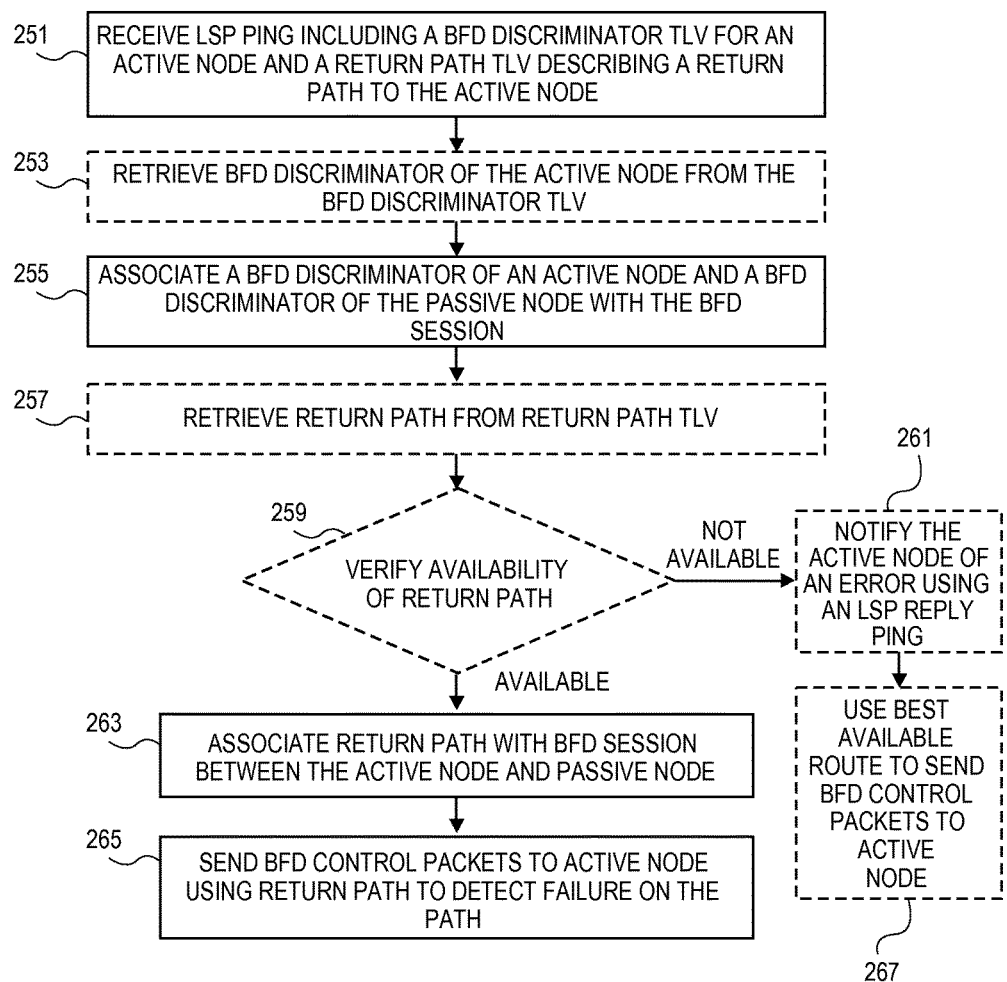
FIG. 2B is a flowchart of one embodiment of a process for establishing a BFD session by a far-end node.

FIG. 2B is a flowchart of one embodiment of the process for establishing the BFD session as implemented by the far-end or passive node in response to receiving an LSP ping. The passive node can be any node in the network other than the active node and is assumed to have at least two paths to the active node to enable the possibility of a forward path and a return path between the active node and passive node that are not co-located such that a BFD session can be established with differing forward and return paths. The passive node is configured to support BFD and bootstrapping of BFD sessions using LSP ping messages as set forth herein. The process of establishing the BFD session is initiated at the passive node when an LSP ping is received (Block 251). The LSP ping can be received over any port of the passive node and from any other node in the network. In the example, the LSP ping is sent by the active node. The LSP ping is modified to include at least a BFD discriminator TLV and a return path TLV. The BFD discriminator TLV includes a BFD discriminator, which is a value that identifies the sending node and is unique at least relative to the passive node. The return path TLV includes data describing a path between the active node and the passive node. The path can be identified using an LSP identifier, a MPLS stack (i.e., a set of labels that identify how a packet is to be forwarded across a set of nodes) or similar format or mechanism for identifying a path in the network. Using an explicitly defined return path can be utilized for any purpose, for example, to monitor additional paths, to match how other data flows are handled between the active and passive nodes, or for similar reasons.

After receipt of the LSP ping, the passive node can access the content of the LSP ping message to retrieve the BFD discriminator for the active node from the BFD discriminator TLV of the message (Block 253). The information in the LSP ping is also verified by the passive node including the Target Forward Equivalency Class (FEC) Stack TLV and the encapsulation of the LSP ping. If this information is validated and if a BFD discriminator was located in the BFD discriminator TLV, then the BFD discriminator of the active node can then be associated with the BFD session being established (Block 255). In addition, a BFD discriminator that is locally unique for the passive node is associated with the BFD session. BFD control packets sent to the active node will include the BFD discriminator of the active node and a BFD discriminator of the passive node. The passive node can also access and retrieve the return path TLV (Block 257). The description of the return path can then be analyzed and associated with the BFD session.

The analysis of the path described by the return path TLV can include verifying the availability of the return path (Block 259). The verification can use any process or mechanism to check the received return path against the network topology available to the passive node. Path availability can be determined on whether the active node is reachable according to the known topology of the passive node along the specified return path or based on the reachability of intermediate nodes such as the first hop according to the return path. If the path is not available, then the active node is notified of the error by generating and sending the error as part of an LSP ping reply or using a similar mechanism (Block 261). The passive node then uses the best available route to send the BFD control packets to the active node instead of the return path described by the received return path TLV (Block 267). The best available route can be determined by using any routing algorithm, for example, the general routing algorithm utilized by the network to determine paths using the shared network topology.

If the received return path is available, then the passive node utilizes the specified path for sending the BFD control packets to the active node. The return path is associated with the BFD session between the active node and the passive node (Block 263). The sending of the BFD control packets to the active node using the return path can then continue for any period of time or during the duration of the BFD session (Block 265). The exchange of the BFD control packets enables the separate detection of the failure of the forward path and the return path between the active node and the passive node.

Figure 3:
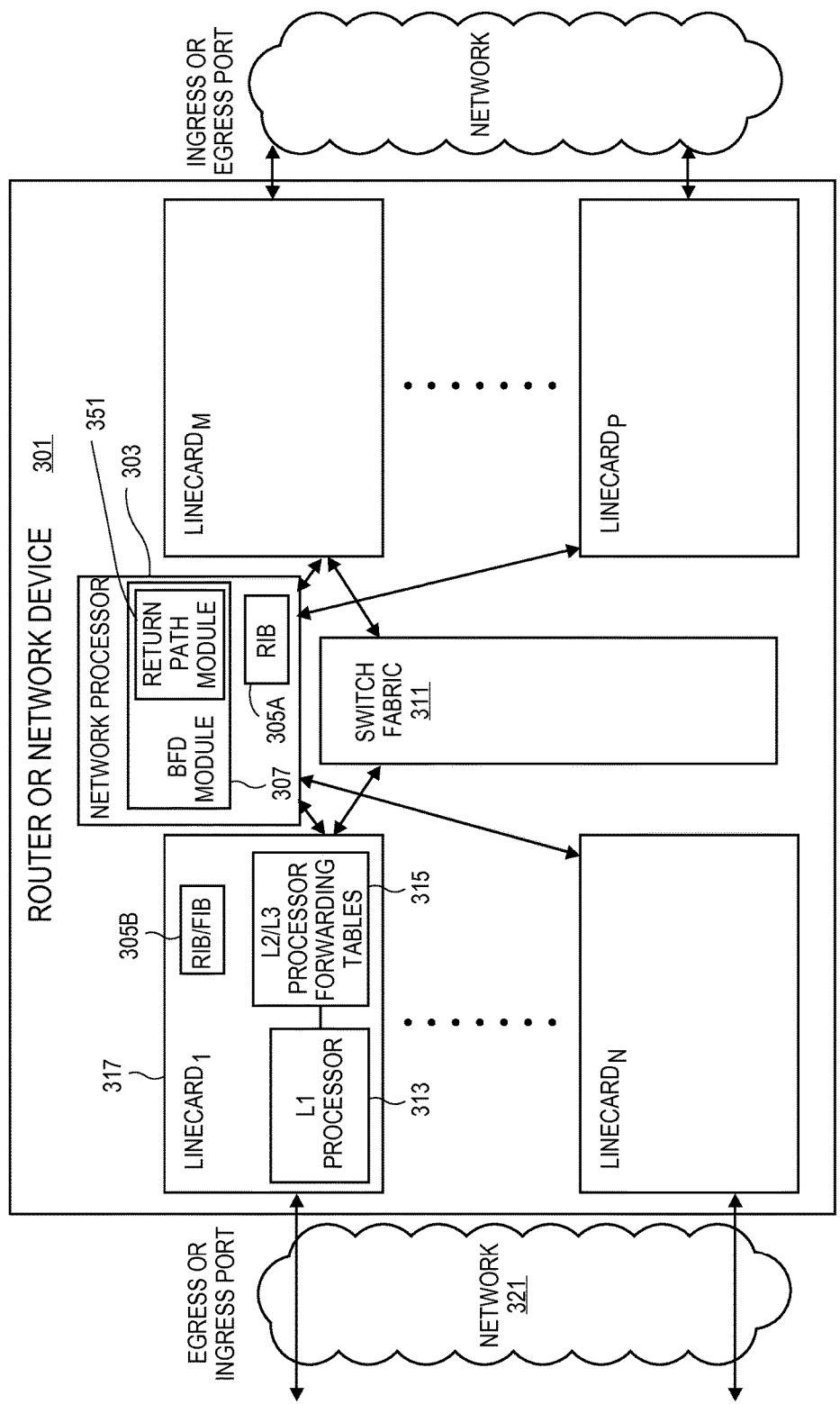
FIG. 3 is a diagram of one embodiment a network device (ND) implementing an asynchronous BFD session with support for explicit return paths.

FIG. 3 illustrates an example of a network device 301 to implement return path control functions for BFD.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process of FIG. 2A and/or FIG. 2B is implemented by a router 301 or network device or similar computing device. The router 301 can have any structure that enables it to receive data traffic and forward it toward its destination. The router 301 can include a network processor 303 or a set of network processors that execute the functions of the router 301. The router 301 or network element can execute BFD including the explicit return path definition functionality via a network processor 303 or other components of the router 301. The network processor 303 can implement the BFD and return path definition functions stored as a BFD module 307 and the return path module 351, wherein the functions include the BFD session initiation, bootstrapping, return path definition and verification described herein above. The return path module 351 may be part of the BFD module 307, as illustrated in FIG. 3, or separate from the BFD module 307. The network processor 303 can also service the routing information base 305A and similar functions related to data traffic forwarding and network topology maintenance.

The BFD and return path definition functions can be implemented as modules in any combination of software, including firmware, and hardware within the router. The functions of the BFD and return path definition processes that are executed and implemented by the router 301 include those described further herein above including the bootstrapping using the LSP ping to provide return path information as part of the establishment of a BFD session between two nodes.

In one embodiment, the router 301 can include a set of line cards 317 that process and forward the incoming data traffic toward the respective destination nodes by identifying the destination and forwarding the data traffic to the appropriate line card 317 having an egress port that leads to or toward the destination via a next hop. These line cards 317 can also implement the forwarding information base 305B, or a relevant subset thereof. The line cards 317 can also implement or facilitate the BFD and return path definition functions described herein above. For example, the line cards 317 can implement LSP ping and LSP ping reply functions and similar functions. The line cards 317 are in communication with one another via a switch fabric 311 and communicate with other nodes over attached networks 321 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 4A, 4B:
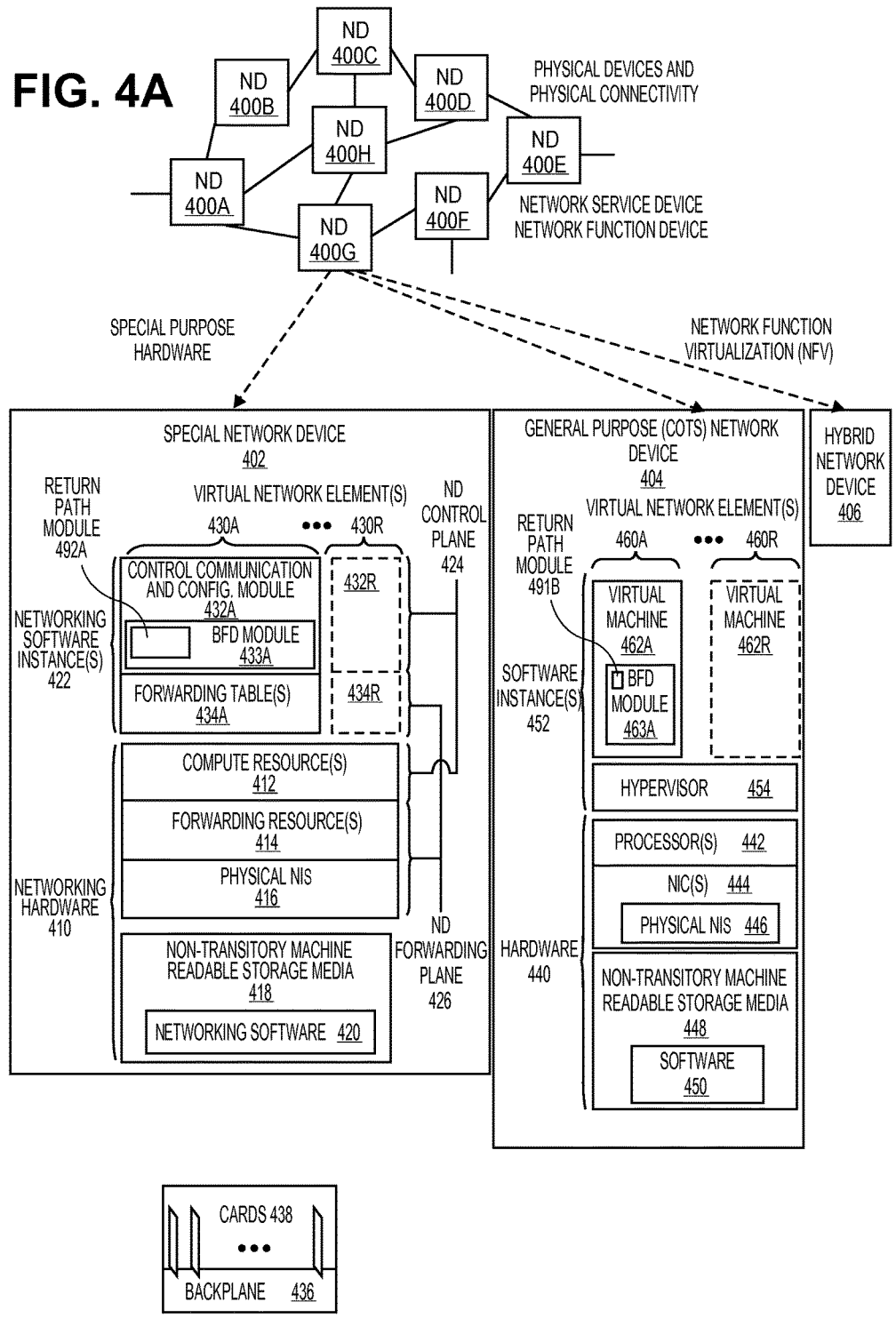
FIG. 4A illustrates connectivity between network devices (NDs) within an exemplary network, as well as three exemplary implementations of the NDs, according to some embodiments of the invention.
FIG. 4B illustrates an exemplary way to implement the special-purpose network device 402 according to some embodiments of the invention.

FIG. 4 illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1200A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A). In some embodiments, the control communication and configuration module 432A encompasses the BFD module 433A that establishes BFD sessions over connected links with remote nodes in the network. A return path module 492A can similarly manage the handling of the explicit definition and exchange of return paths where they differ from the forward paths of the BFD sessions.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R. In some embodiments, the virtual machine module 462A encompasses a BFD module 463A that manages the configuration of BFD session between the network device and another network device. The return path module 491B can similarly facilitate the establishment of BFD sessions, in particular, where it is desirable to have separate forward and return paths for the BFD sessions.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 06, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the virtual machines 462A-R may operate as servers; the same would be true for the hybrid network device 406; in the case of the special-purpose network device 402, one or more such servers could also be run on a hypervisor executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach). In some embodiments, the centralized reachability and forwarding information module 479 encompasses BFD functions in a BFD module 481 that manages the establishment of BFD sessions between the network devices. A return path module 491 can similarly manage the establishment of explicit return paths between these network devices. In this embodiment, the BFD session does not need to be bootstrapped using the LSP ping, thus, the BFD module 481 and return path module 491 have visibility to identify the forward path and return path and to configure each of the end nodes to send the BFD control packets along the appropriate path (i.e., the forward path or return path). Similarly, the return path module 491 can verify the availability of these return paths.

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the PCE 499 as described herein above and/or an associated PCA (not shown) can be implemented at the application layer 486.

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
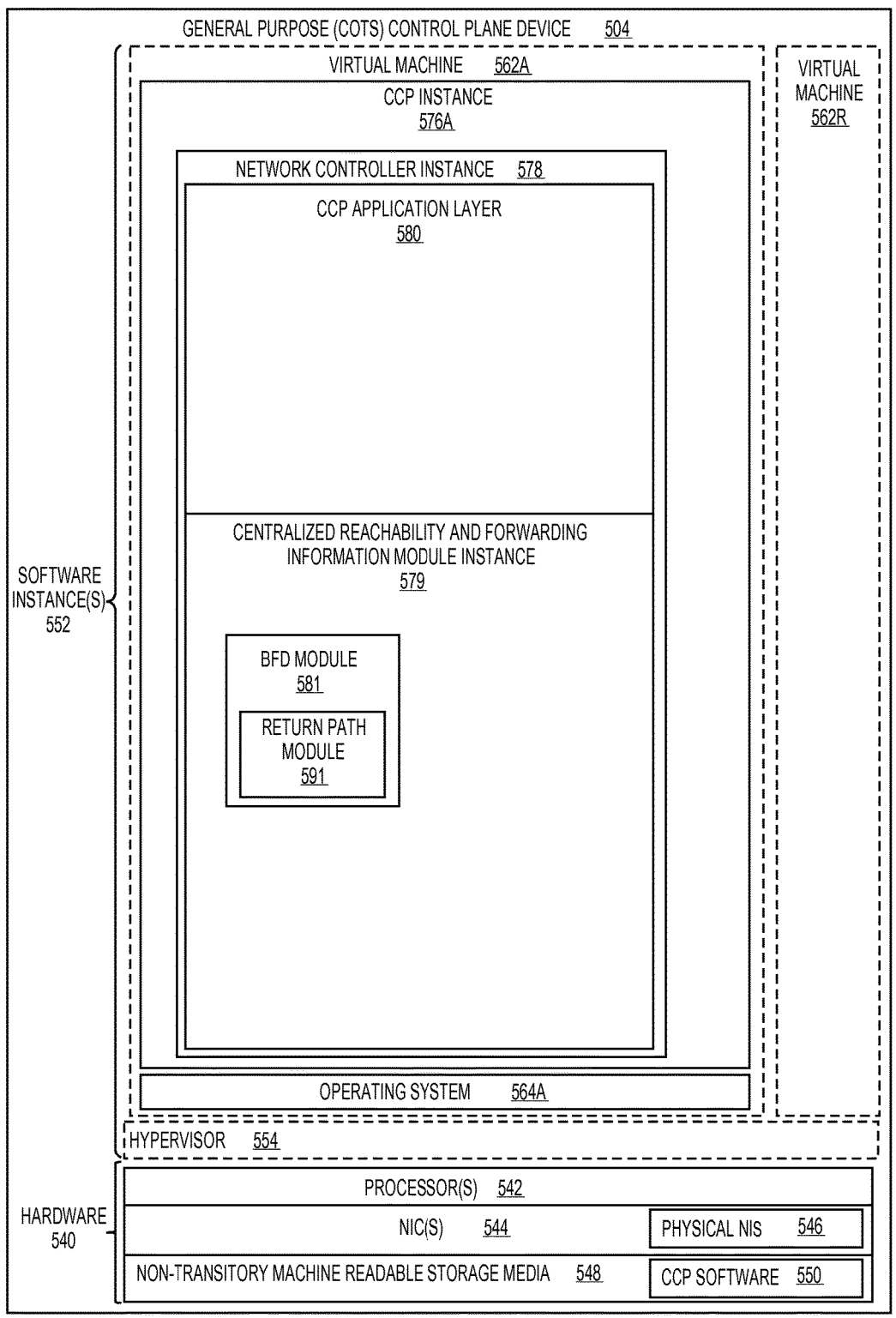
FIG. 5 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 1576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller 578 to the operating system 564A and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network), and the middleware layer provides the conversion from the virtual networks to the physical view. The CCP application layer 580 can encompass the functionality of the BFD module 581 and the return path module 591 as described herein above.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a network device to establish a bidirectional forwarding detection (BFD) session with a defined return path to enable detection of data plane failures between an active node and a passive node in a network where a forward path and a reverse path between the active node and the passive node are not co-routed, the method comprising the steps of:
   receiving a label switched path (LSP) ping before establishment of the BFD session, the LSP ping including a BFD discriminator type length value (TLV) of the active node and a return path TLV describing a return path to the active node;
   associating a BFD discriminator of the active node and a BFD discriminator of the passive node with the BFD session;
   in response to the return path being available, associating, by a network processor of the network device, the return path with the BFD session between the active node and the passive node, and sending BFD control packets to the active node using the return path to detect a failure on the return path; and
   in response to the return path being unavailable, using, by the network processor, a best available route to send the BFD control packets to the active node.

2. The method of claim 1, further comprising the step of: verifying availability of the return path.

3. The method of claim 2, further comprising the step of: notifying the active node of an error using LSP ping reply in response to the verifying indicating that the return path is not available.

4. The method of claim 1, further comprising the steps of: retrieving a BFD discriminator of the active node from the BFD discriminator TLV; and
   retrieving the return path from the return path TLV.

5. The method of claim 1, wherein the return path is indicated by a LSP identifier or a multi-protocol label (MPLS) stack.

6. A network device to establish a bidirectional forwarding detection (BFD) session with a defined return path to enable detection of data plane failures between an active node and a passive node in a network where a forward path and a reverse path between the active node and the passive node are not co-routed, the network device comprising:
   a non-transitory machine-readable storage medium configured to store a BFD module and a return path module; and
   a network processor communicatively coupled to the non-transitory machine-readable storage medium, the network processor configured to execute the BFD module and the return path module, the BFD module configured to receive a label switched path (LSP) ping, before establishment of the BFD session, the LSP ping including a BFD discriminator type length value (TLV) of the active node and a return path TLV describing a return path to the active node, and to associate a BFD discriminator of the active node and a BFD discriminator of the passive node with the BFD session, the return path module configured in response to the return path being available, to associate the return path with a BFD session between the active node and the passive node, and to send BFD control packets to the active node using the return path to detect a failure on the return path, and in response to the return path being unavailable, to use a best available route to send the BFD control packets to the active node.

7. The network device of claim 6, wherein the return path module is further configured to verify availability of the return path.

8. The network device of claim 7, wherein the return path module is further configured to notify the active node of an error using LSP ping reply in response to the return path not being available.

9. The network device of claim 6, wherein the BFD module is further configured to retrieve a BFD discriminator of the active node from the BFD discriminator TLV, and to retrieve the return path from the return path TLV.

10. The network device of claim 6, wherein the return path is indicated by a LSP identifier or a multi-protocol label (MPLS) stack.

11. A computing device executing a plurality of virtual machines for implementing network function virtualization (NFV), wherein a virtual machine from the plurality of virtual machines is configured to execute a method to establish a bidirectional forwarding detection (BFD) session with a defined return path to enable detection of data plane failures between an active node and a passive node in a network where a forward path and a reverse path between the active node and the passive node are not co-routed, the computing device comprising:
  a non-transitory machine-readable storage medium configured to store a BFD module and a return path module; and
  a processor communicatively coupled to the non-transitory machine-readable storage medium, the processor configured to execute the virtual machine that executes the BFD module and the return path module, the BFD module configured to receive a label switched path (LSP) ping, before establishment of the BFD session, the LSP ping including a BFD discriminator type length value (TLV) of the active node and a return path TLV describing a return path to the active node, and to associate a BFD discriminator of the active node and a BFD discriminator of the passive node with the BFD session, the return path module configured in response to the return path being available, to associate the return path with a BFD session between the active node and the passive node, and to send BFD control packets to the active node using the return path to detect a failure on the return path, and in response to the return path being unavailable, to use a best available route to send the BFD control packets to the active node.

12. The computing device of claim 11, wherein the return path module is further configured to verify availability of the return path.

13. The computing device of claim 12, wherein the return path module is further configured to notify the active node of an error using LSP ping reply in response to the return path not being available.

14. The computing device of claim 11, wherein the BFD module is further configured to retrieve a BFD discriminator of the active node from the BFD discriminator TLV, and to retrieve the return path from the return path TLV.

15. The computing device of claim 11, wherein the return path is indicated by a LSP identifier or a multi-protocol label (MPLS) stack.

16. A control plane device configured to implement at least one centralized control plane for a software defined network (SDN), the centralized control plane configured to execute a method to establish a bidirectional forwarding detection (BFD) session with a defined return path to enable detection of data plane failures between an active node and a passive node in a network where a forward path and a reverse path between the active node and the passive node are not co-routed, the control plane device comprising:
  a non-transitory machine-readable storage medium configured to store a BFD module and a return path module; and
  a processor communicatively coupled to the non-transitory machine-readable storage medium, the processor configured to execute the BFD module and the return path module, the BFD module configured to determine a BFD discriminator of the active node and a return path to the active node, and to associate a BFD discriminator of the active node and a BFD discriminator of the passive node with the BFD session, the return path module configured in response to the return path being available, to associate the return path with a BFD session between the active node and the passive node, and to configure the passive node to send BFD control packets to the active node using the return path to detect a failure on the return path, and in response to the return path being unavailable, to use a best available route to send the BFD control packets to the active node.

17. The control plane device of claim 16, wherein the return path module is further configured to verify availability of the return path.

18. The network device of claim 17, wherein the return path is indicated by a LSP identifier or a multi-protocol label (MPLS) stack.

* * * * *